J. C. BARLOW.
Seeding-Machine.
No. 162,599. Patented April 27, 1875.
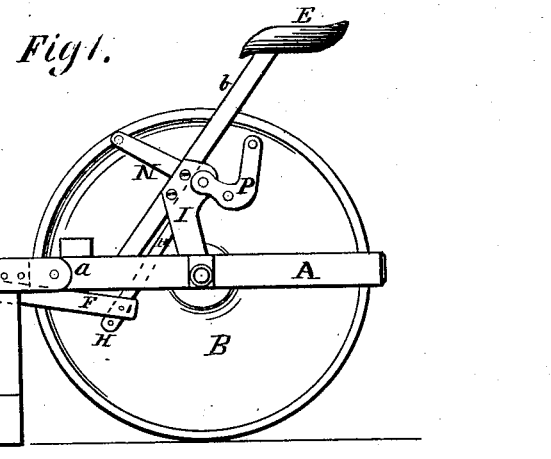
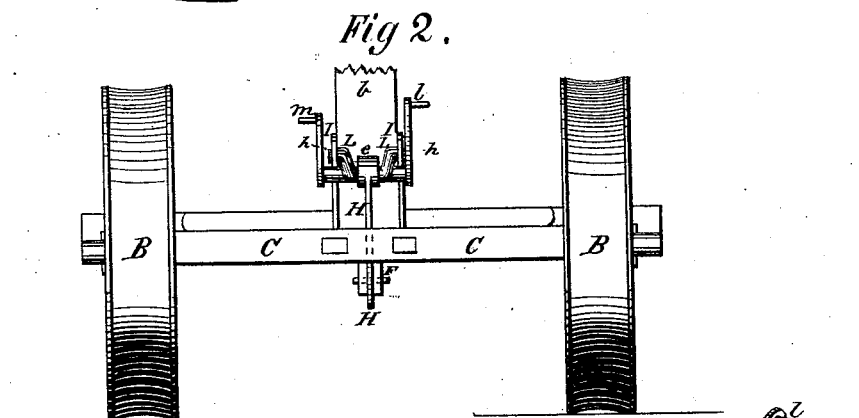
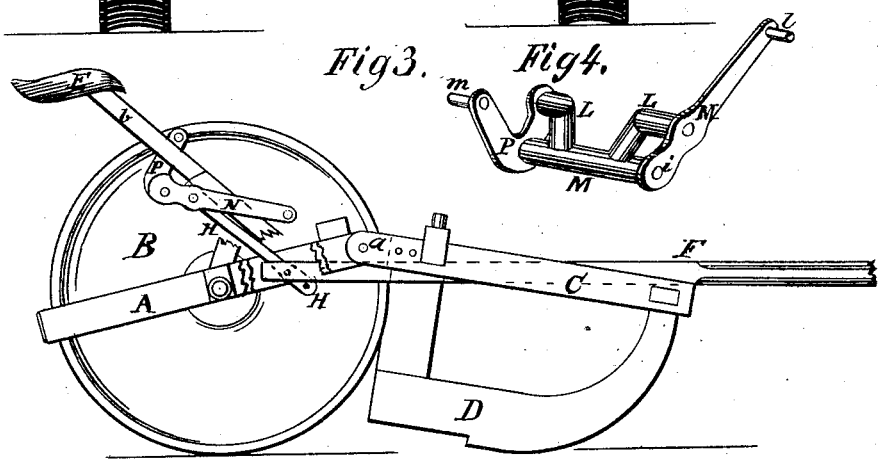
Witnesses:
Wm. C. Chaffee
Thos. Jewell
Inventor:
Joseph C. Barlow
by his atty's
Cox & Cox

UNITED STATES PATENT OFFICE.

JOSEPH C. BARLOW, OF QUINCY, ILLINOIS, ASSIGNOR TO THE VANDIVER CORN-PLANTER COMPANY, OF SAME PLACE.

IMPROVEMENT IN SEEDING-MACHINES.

Specification forming part of Letters Patent No. 162,599, dated April 27, 1875; application filed September 15, 1874.

*To all whom it may concern:*

Be it known that I, JOSEPH C. BARLOW, of Quincy, Illinois, have invented certain new and useful Improvements in Devices for Operating the Frames of Seeding-Machines, of which the following is a specification, reference being had to the accompanying drawings.

The invention relates to an improvement in devices for elevating and depressing the frame of seeding-machines, which has attached to it the furrowing mechanism, and is especially applicable to corn-planters.

It consists of two levers properly secured to a shaft working in bearings under the standard sustaining the driver's seat, and connected by a pitman-rod with the rear of the front frame or tongue, the latter being securely attached to the front frame, which has the furrowing mechanism—all so arranged that the driver may, by pressing one lever downward and forward, raise the front frame and furrowing devices clear of the ground, or lock the operating mechanism, thus holding the front frame in position, as desired; or, by pressing downward and rearward upon the opposite lever, he may force the rear end of the front frame downward, thus deepening the furrow. The mechanism carrying the invention is mounted upon wheels and connected by hinges, or pivoted to the device which has the furrowing machine, which usually supports the device or frame. When the pitman-rod is connected with some other part of the front frame than the rear end of the tongue, the latter is received in front of it. If connected with the tongue the latter is securely attached to the frame. In either case the front end of the tongue is supported by the harness between the horses.

The object of the invention is to provide a convenient means of enabling the driver of the planter to lessen or increase the depth of the furrow, or to raise the frame having the furrowing devices clear of the ground.

Figure 1 is a side elevation of a device embodying the elements of the invention, one of the wheels being removed. Fig. 2 is a rear elevation of same, both wheels shown. Fig. 3 is a side elevation, illustrating operation. Fig. 4 is a detached view of the operative mechanism.

In the accompanying drawings, A is a frame supported by the wheels B, and connected with the frame C supported by the runners D, the frames A and C being hinged together in any suitable manner, as shown at $a$. The driver's seat E is placed above the frame A, and sustained by the standard $b$ inclining downward and forward, its lower end securely attached to the front central part of the frame, and having the slot $d$ in its lower edge to receive the tongue F, which passes under and is secured to the frame C, its front end being supported by the neck-yoke between the horses, which are hitched to the tongue in front of the frame C. The rear end of the tongue F is slotted to receive the front end of the pitman-rod H, which is pivoted there, and which extends upward and backward, having the loop or sleeve $e$, which encompasses the shaft under the standard sustaining the driver's seat. Upon each side of the standard $b$, and securely attached thereto, are the plates I, the rear upper ends of which extend beyond the standard, and are provided with apertures $h$, in which are journaled the ends of the elbows or cranks L, which extend inward toward each other, thence downward until they are united with or attached to the shaft M, the loop $e$ being placed between them. The ends of crank L extend beyond the plates I, and are secured to the operating-levers N and P to prevent them turning. The ends of the shaft M extend on each side beyond the outer sides of the plates I, and are reduced to axles, one of which is secured in the aperture $i$, at the end of the lever N, which extends upward and forward, having its front end provided with a suitable foot-rest, $l$, which is located in convenient reach of the driver's foot. The axle of the crank L passes through the lever N, forming its fulcrum. Upon the other side of the standard $b$ is provided the bent lever P, the arm of which extends upward and rearward, its elbow receiving one of the axles of the shaft M, while the end of the lever receives one of the axles of the crank L as a fulcrum projecting through the plate I. The lever P is supplied with the foot-rest m, which stands below and under the front edge of the driver's seat, and in convenient location to his foot.

The above are the several positions of the mechanisms mentioned when the frames A and C are on the same level.

When it is desired to raise the frame C, or lessen the draft of the furrowing mechanism or depth of the furrow, the driver places his right foot upon the rest l, and, by pressing thereon, his body sustained in the seat, he can exert his whole strength, and thus forces it downward and forward, which rotates and elevates the shaft M, the axle of the crank L acting as a fulcrum to the lever N, thus drawing the pitman-rod upward and backward, which imparts to the rear end of the tongue F, or rear side of the frame C, (if the pitman be attached to another part thereof than the tongue,) an upward movement, and the front part of the frame C being supported by the tongue, it may be raised so that the furrowing mechanism shall clear the ground, or come in contact therewith to the desired diminished depth. If it is desired to sustain the frame so that the furrowing mechanism is clear of the ground, it is only necessary to force the lever N downward until it stands at the same inclination as the pitman-rod, when the devices will be locked, the shaft M, lever N, and pitman-rod H, all being in the same plane. If it be desired to deepen the furrow, the driver places his foot upon the rest m, and pushes it downward. This forces the pitman-rod downward and forward, thus depressing the rear end of the frame C, forcing the heels of the runners or furrowing mechanism deeper into the ground.

It is obvious that the tongue F may be rigidly secured to some other part of the frame C, and the pitman-rod connected with the frame by a suitable device near its rear, and directly behind the rear end of the tongue, which should be secured on the central line of the frame. It is also obvious that the cranks L may be dispensed with, and the lower end of the lever P and the central lower part of the lever N pivoted to the plates I. Preferably, however, the cranks L are used, since they act upon the shaft M in immediate relation to the sleeve or loop e.

What I claim as my invention, and desire to secure by Letters Patent, is—

1. In a seed-planter, having two frames pivoted together, one supported by wheels, and the other having the furrowing mechanism, the crank-shaft M, having the levers N and P, substantially as and for the purpose set forth.

2. In a seed-planter, having the pivoted frames, the combination of the pitman H, crank-shaft M, and levers N and P, as and for the purpose expressed.

3. In a seed-planter, having the pivoted frames, the crank-shaft M L, lever N, bent lever P, and foot-rests m and l, constructed and arranged substantially as specified.

In testimony that I claim the foregoing improvements in devices for operating the frames of seeding-machines, as above described, I have hereunto set my hand and seal this 19th day of August, 1874.

JOSEPH C. BARLOW. [L. S.]

Witnesses:
 C. P. WEBSTER,
 WM. H. MINNIX.